US012342315B2

(12) United States Patent
Won

(10) Patent No.: US 12,342,315 B2
(45) Date of Patent: Jun. 24, 2025

(54) METHOD AND APPARATUS TO CONTROL ACCESS ATTEMPTS DUE TO POSITIONING

(71) Applicant: Nokia Technologies Oy, Espoo (FI)

(72) Inventor: Sung Hwan Won, Seoul (KR)

(73) Assignee: NOKIA TECHNOLOGIES OY, Espoo (FI)

( * ) Notice: Subject to any disclaimer, the term of this patent is extended or adjusted under 35 U.S.C. 154(b) by 335 days.

(21) Appl. No.: 17/633,253

(22) PCT Filed: Aug. 7, 2020

(86) PCT No.: PCT/US2020/045372
§ 371 (c)(1),
(2) Date: Feb. 7, 2022

(87) PCT Pub. No.: WO2021/030181
PCT Pub. Date: Feb. 18, 2021

(65) Prior Publication Data
US 2022/0369272 A1    Nov. 17, 2022

Related U.S. Application Data

(60) Provisional application No. 62/884,743, filed on Aug. 9, 2019.

(51) Int. Cl.
*H04W 64/00* (2009.01)
*H04W 48/04* (2009.01)
(Continued)

(52) U.S. Cl.
CPC ......... *H04W 64/003* (2013.01); *H04W 48/04* (2013.01); *H04W 60/04* (2013.01); *H04W 12/02* (2013.01); *H04W 12/63* (2021.01)

(58) Field of Classification Search
CPC .... H04W 48/04; H04W 60/04; H04W 64/003
(Continued)

(56) References Cited

U.S. PATENT DOCUMENTS

2006/0194591 A1   8/2006   Xiong et al. ............... 455/456.2
2006/0293066 A1*  12/2006  Edge ...................... H04W 4/02
                                                      455/456.3
(Continued)

FOREIGN PATENT DOCUMENTS

CN      102484766 A     5/2012
WO      2018085017 A1   5/2018

OTHER PUBLICATIONS

3GPP TSG-CT WG1 Meeting #112, West Palm Beach, FL (USA), Aug. 20-24, 2018, C1-185765, "Access attempt due to delivery of LPP message/transparent container/UE policy container", Nokia, Nokia Shanghai Bell, 4 pgs.
3GPP TSG CT WG1 Meeting #116, Xi'an, P.R. of China, Apr. 8-12, 2019, C1-192109, "Handling of network rejection in the UE NAS layer", Nokia, Nokia Shanghai Bell, 16 pgs.
3GPP TSG SA WG2 Architecture—S2#49, Nov. 7-11, 2005, Yokosuka, Japan, S2-052484, "Privacy support in the proposed periodic location event", Qualcomm, 4 pgs.
(Continued)

*Primary Examiner* — Joel Ajayi
(74) *Attorney, Agent, or Firm* — Lippes Mathias LLP

(57) ABSTRACT

A method and apparatus for providing access control for mobile originated location requests, particularly, but not limited to, in 5G networks. An access attempt message triggered by a mobile originated location request or other 5GMM procedure may be assigned an access category based on whether a mobile originated location request procedure is ongoing or not ongoing. The message assigned the access category may be an LTE positioning protocol message. Possible access categories may include, for example, an MT_acc category for non-ongoing procedures and an MO_sig category for ongoing procedures, An access control check may be performed unless the mobile device switches from an idle to a connected mode.

11 Claims, 5 Drawing Sheets

(51) Int. Cl.
*H04W 60/04* (2009.01)
*H04W 12/02* (2009.01)
*H04W 12/63* (2021.01)

(58) Field of Classification Search
USPC .................................................... 455/456.1
See application file for complete search history.

(56) References Cited

U.S. PATENT DOCUMENTS

| 2011/0009130 | A1* | 1/2011 | Wu | ............ | H04W 64/00 |
| | | | | | 455/456.1 |
| 2016/0157253 | A1 | 6/2016 | Yamine et al. | | |
| 2019/0053010 | A1* | 2/2019 | Edge | ............ | H04W 64/00 |

OTHER PUBLICATIONS

3GPP TSG-SA2 Meeting #134, Sapporo, Japan, Jun. 24-28, 2019, S2-1907615, "Completion of 5GC-MO-LR Procedure for TS 23.273", Huawei, HiSilicon, 4 pgs.
Search report for ID Application No. P00202201476, in both ID and EN, dated Sep. 29, 2024.
Weimin, et al., Research on LTE Mobility Management, China Academic Journal Electronic Publishing, Jun. 2010.
Search Report, CN App. No. 2020800678583 dated Feb. 28, 2025, including machine translation.
Office Action, CN App. No. 2020800678583 dated Feb. 28, 2025.

* cited by examiner

METHOD AND APPARATUS TO CONTROL ACCESS ATTEMPTS DUE TO POSITIONING

CROSS REFERENCE TO RELATED APPLICATION

This patent application is a U.S. National Stage application of International Patent Application Number PCT/US2020/045372 filed Aug. 7, 2020, which is hereby incorporated by reference in its entirety, and claims priority to U.S. provisional application 62/884,743 filed Aug. 9, 2019, which is hereby incorporated by reference in its entirety.

BACKGROUND

Technical Field

The example and non-limiting embodiments relate generally to communications and, more particularly, to access control for mobile originated location requests.

Brief Description of Prior Developments

It is known for a user equipment to provide access control for mobile terminating location requests.

BRIEF DESCRIPTION OF THE DRAWINGS

The foregoing aspects and other features are explained in the following description, taken in connection with the accompanying drawings, wherein.

DETAILED DESCRIPTION OF EMBODIMENTS

Figure 1:
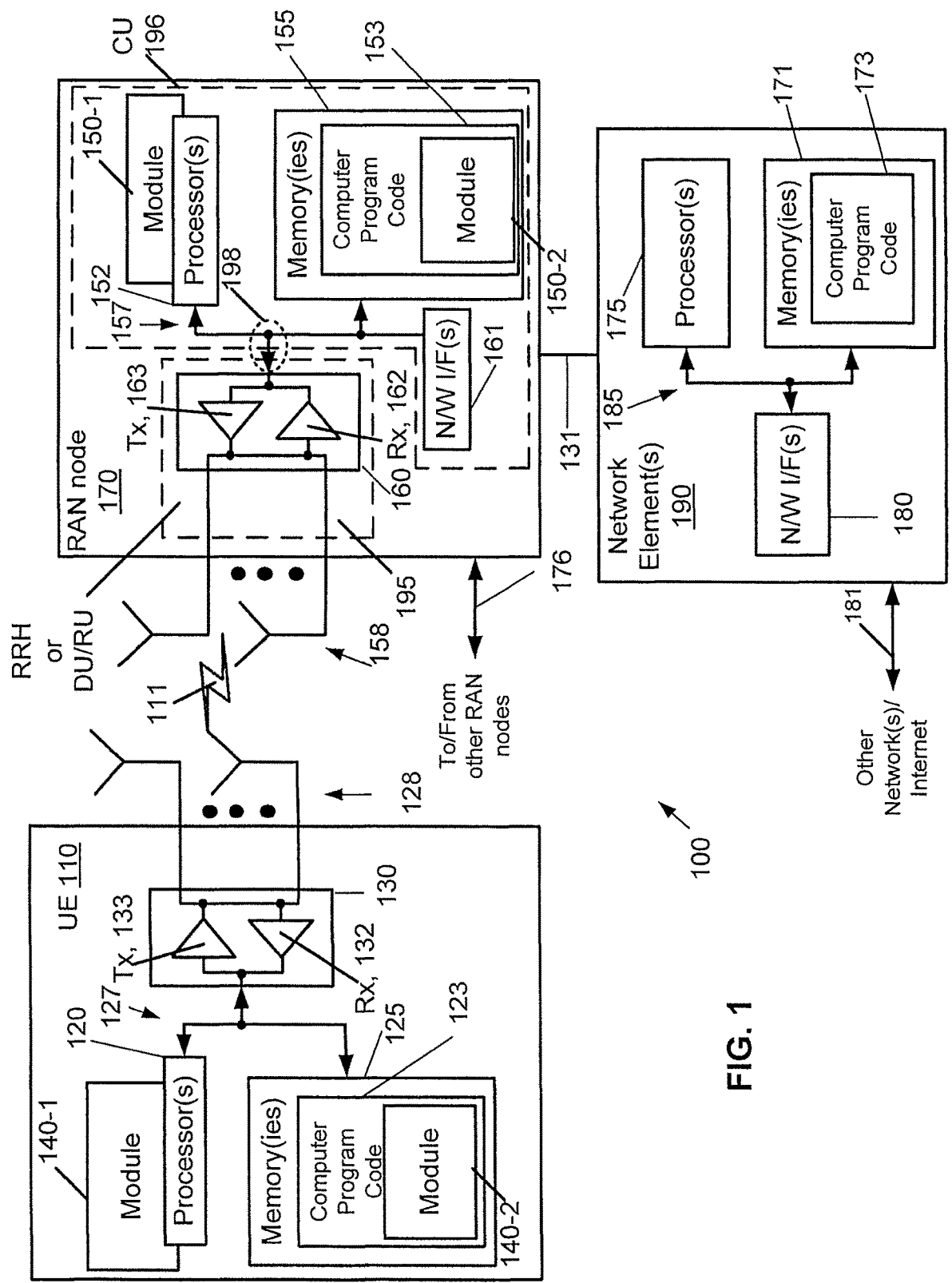
FIG. 1 is a block diagram of one possible and non-limiting exemplary system in which the exemplary embodiments may be practiced.

The following abbreviations that may be found in the specification and/or the drawing figures are defined as follows:

3GPP third generation partnership project
5G fifth generation
5GC 5G core network
5GMM 5G mobility management
5GS 5G system
AMF access and mobility management function
CU central unit
DL downlink
DU distributed unit
eNB (or eNodeB) evolved Node B (e.g., an LTE base station)
EN-DC E-UTRA-NR dual connectivity
en-gNB or En-gNB node providing NR user plane and control plane protocol terminations towards the UE, and acting as secondary node in EN-DC
E-UTRA evolved universal terrestrial radio access, i.e., the LTE radio access technology
gNB (or gNodeB) base station for 5G/NR, i.e., a node providing NR user plane and control plane protocol terminations towards the UE, and connected via the NG interface to the 5GC
I/F interface
LPP LTE positioning protocol
LR location request
LTE long term evolution
MAC medium access control
MME mobility management entity
MMTEL multimedia telephony
MO mobile originated
MO-LR mobile originating/originated location request
MO-SMSoNAS mobile originated short message service over non-access stratum
MT mobile terminated
MT-LR mobile terminating/terminated location request
NAS non-access stratum
ng or NG new generation
ng-eNB or NG-eNB new generation eNB
NR new radio
N/W or NW network
PDCP packet data convergence protocol
PHY physical layer
RAN radio access network
RRH remote radio head
RRC radio resource control
RU radio unit
Rx receiver
SDAP service data adaptation protocol
SGW serving gateway
SMF session management function
SMS short message service
SMSoIP short message service over internet protocol
TS technical specification
Tx transmitter
UE user equipment (e.g., a wireless, typically mobile device)
UL uplink
UPF user plane function Turning to FIG. 1, this figure shows a block diagram of one possible and non-limiting example in which the examples may be practiced. A user equipment (UE) 110, radio access network (RAN) node 170, and network element(s) 190 are illustrated. In the example of FIG. 1, the user equipment (UE) 110 is in wireless communication with a wireless network 100. A UE is a wireless device that can access the wireless network 100. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a module 140, comprising one of or both parts 140-1 and/or 140-2, which may be implemented in a number of ways. The module 140 may be implemented in hardware as module 140-1, such as being implemented as part of the one or more processors 120. The module 140-1 may be implemented also as an integrated circuit or through other hardware such as a programmable gate array. In another example, the module 140 may be implemented as module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with RAN node 170 via a wireless link 111.

The RAN node 170 in this example is a base station that provides access by wireless devices such as the UE 110 to the wireless network 100. The RAN node 170 may be, for example, a base station for 5G, also called New Radio (NR). In 5G, the RAN node 170 may be a NG-RAN node, which is defined as either a gNB or a ng-eNB. A gNB is a node providing NR user plane and control plane protocol terminations towards the UE, and connected via the NG interface to a 5GC (such as, for example, the network element(s) 190). The ng-eNB is a node providing E-UTRA user plane and control plane protocol terminations towards the UE, and connected via the NG interface to the 5GC. The NG-RAN node may include multiple gNBs, which may also include a central unit (CU) (gNB-CU) 196 and distributed unit(s) (DUs) (gNB-DUs), of which DU 195 is shown. Note that the DU may include or be coupled to and control a radio unit (RU). The gNB-CU is a logical node hosting RRC, SDAP and PDCP protocols of the gNB or RRC and PDCP protocols of the en-gNB that controls the operation of one or more gNB-DUs. The gNB-CU terminates the F1 interface connected with the gNB-DU. The F1 interface is illustrated as reference 198, although reference 198 also illustrates a link between remote elements of the RAN node 170 and centralized elements of the RAN node 170, such as between the gNB-CU 196 and the gNB-DU 195. The gNB-DU is a logical node hosting RLC, MAC and PHY layers of the gNB or en-gNB, and its operation is partly controlled by gNB-CU. One gNB-CU supports one or multiple cells. One cell is supported by only one gNB-DU. The gNB-DU terminates the F1 interface 198 connected with the gNB-CU. Note that the DU 195 is considered to include the transceiver 160, e.g., as part of a RU, but some examples of this may have the transceiver 160 as part of a separate RU, e.g., under control of and connected to the DU 195. The RAN node 170 may also be an eNB (evolved NodeB) base station, for LTE (long term evolution), or any other suitable base station or node.

The RAN node 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The CU 196 may include the processor(s) 152, memories 155, and network interfaces 161. Note that the DU 195 may also contain its own memory/memories and processor(s), and/or other hardware, but these are not shown.

The RAN node 170 includes a module 150, comprising one of or both parts 150-1 and/or 150-2, which may be implemented in a number of ways. The module 150 may be implemented in hardware as module 150-1, such as being implemented as part of the one or more processors 152. The module 150-1 may be implemented also as an integrated circuit or through other hardware such as a programmable gate array. In another example, the module 150 may be implemented as module 150-2, which is implemented as computer program code 153 and is executed by the one or more processors 152. For instance, the one or more memories 155 and the computer program code 153 are configured to, with the one or more processors 152, cause the RAN node 170 to perform one or more of the operations as described herein. Note that the functionality of the module 150 may be distributed, such as being distributed between the DU 195 and the CU 196, or be implemented solely in the DU 195.

The one or more network interfaces 161 communicate over a network such as via the links 176 and 131. Two or more gNBs 170 may communicate using, e.g., link 176. The link 176 may be wired or wireless or both and may implement, for example, an Xn interface for 5G, an X2 interface for LTE, or other suitable interface for other standards.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195 for LTE or a distributed unit (DU) 195 for gNB implementation for 5G, with the other elements of the RAN node 170 possibly being physically in a different location from the RRH/DU, and the one or more buses 157 could be implemented in part as, for example, fiber optic cable or other suitable network connection to connect the other elements (e.g., a central unit (CU), gNB-CU) of the RAN node 170 to the RRH/DU 195. Reference 198 also indicates those suitable network link(s).

It is noted that description herein indicates that "cells" perform functions, but it should be clear that equipment which forms the cell will perform the functions. The cell makes up part of a base station. That is, there can be multiple cells per base station. For example, there could be three cells for a single carrier frequency and associated bandwidth, each cell covering one-third of a 360 degree area so that the single base station's coverage area covers an approximate oval or circle. Furthermore, each cell can correspond to a single carrier and a base station may use multiple carriers. So, if there are three 120 degree cells per carrier and two carriers, then the base station has a total of 6 cells.

The wireless network 100 may include a network element or elements 190 that may include core network functionality, and which provides connectivity via a link or links 181 with a further network, such as a telephone network and/or a data communications network (e.g., the Internet). Such core network functionality for 5G may include access and mobility management function(s) (AMF(S)) and/or user plane functions (UPF(s)) and/or session management function(s) (SMF(s)). Such core network functionality for LTE may include MME (Mobility Management Entity)/SGW (Serving Gateway) functionality. These are merely exemplary functions that may be supported by the network element(s) 190, and note that both 5G and LTE functions might be supported. The RAN node 170 is coupled via a link 131 to a network element 190. The link 131 may be implemented as, e.g., an NG interface for 5G, or an S1 interface for LTE, or other suitable interface for other standards. The network element 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the network element 190 to perform one or more operations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, RAN node 170, and other functions as described herein.

In general, the various embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

Features as described herein generally relate to access control for mobile originated location requests (MO-LR).

Location requests (LR) may be sent by a network or application server to a user equipment (UE). These location requests are considered to be mobile terminated/terminating location requests (MT-LR). Location requests may also be sent by the UE to, e.g., a network or application server. These location requests are considered to be mobile originated location requests (MO-LR).

Location requests may be sent using the LTE Positioning Protocol (LPP). LPP messages may be sent point-to-point between a location server (i.e. a network node) and a target device (i.e. a UE) in order to position the target device. LPP may be used with LTE location requests, 5G location requests, or other/future types of location requests.

For previous 3GPP mobile networks, MT-LR and MO-LR were defined. For 5G networks, access control for MT-LR has been specified in a current version of TS 24.501; there is a note in TS 24.501 that access control for MO-LR has not been specified because MO-LR is not supported. For 5G networks, it has previously been assumed that any/all LPP messages are MT-LR, meaning that a service is initiated from the network side, not by a UE.

3GPP TS 24.501 contains the most recent version of a unified access control framework in the 5G system (5GS).

As can be seen from the following note currently included in clause 4.5.1 of 3GPP TS 24.501, a mobile originating location request has not been considered in the NAS protocol:

"NOTE 2: In this version of the protocol, initiating a mobile originating location request by sending an UL NAS TRANSPORT message (see subclause 5.4.5.2.1) is not supported, and therefore access control for this case has not been specified. All LPP messages transported in the UL NAS TRANSPORT message are sent in response to a mobile terminating or network induced location request, and the corresponding access attempts are handled as MT access."

Figure 2:
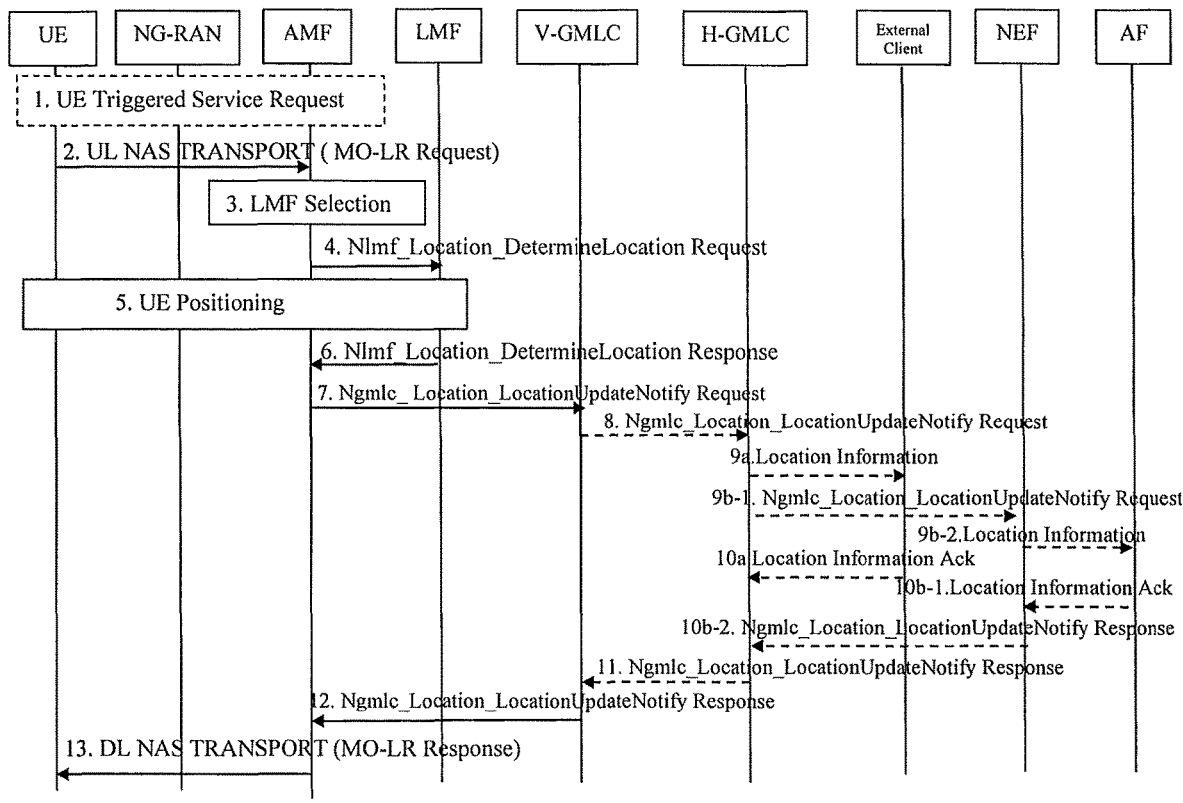
FIG. 2 is a diagram illustrating features as described herein.

For Rel-16 of TS 23.273, MO-LR has been specified, but a procedure for access control for MO-LR has not yet been defined. Referring now to FIG. 2, illustrated is an example of a 5G core network mobile originated location request (5GC-MO-LR) procedure. In FIG. 2, initiation of step 2, or step 1 if performed, should go through access control. In FIG. 2, while the 5GC-MO-LR procedure is ongoing, a 5G mobility management (5GMM) connection management procedure for non-access stratum (NAS) signaling recovery should not be subject to access control check, even though an access category needs to be assigned for the access attempt.

Because location requests, in contrast to other services, may take a considerable amount of time (i.e., up to 10 seconds), it is possible that a UE would enter IDLE mode during the procedure. Because of this, an MT-LR LPP message is generally assigned the access category "0" (MT_acc), which prevents the LPP message from being barred. In contrast, for other services, there is no mechanism to exempt an MO message from being barred because it is assumed that the UE will seldom go idle during an MO procedure.

Access control for MO-LR presents different challenges than access control for MT-LR. In an example embodiment, the unified access control framework found in 3GPP TS 24.501 may be modified according to the present disclosure.

Figure 3:
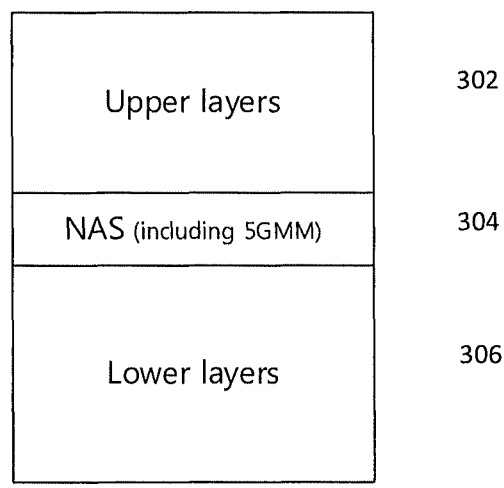
FIG. 3 is a diagram illustrating features as described herein.

Referring now to FIG. 3, which illustrates an example simplified protocol stack in the UE, in an example embodiment, in the UE NAS layer 304, a 5GMM connection management procedure initiated for the purpose of transporting an LPP message in an ongoing 5GC-MO-LR procedure might not be categorized as MT_acc.

In an example embodiment, in the UE NAS layer 304, a new event may be identified in which 5GMM receives a request from upper layers 302 to send a mobile originated location request, unless the request triggered a service request procedure to transition the UE from 5GMM-IDLE mode to 5GMM-CONNECTED mode. In other words, if the request triggers the UE to transition from idle mode to connected mode, the new event has not occurred. Examples of this new event may include: the UE-initiated NAS transport procedure for transporting a mobile originated location request; the 5GMM connection management procedure triggered by the UE-initiated NAS transport procedure for transporting the mobile originated location request; and NAS signaling connection recovery during an ongoing 5GC-MO-LR procedure.

In an example embodiment, in the UE NAS layer 304, the new event may be categorized as MO_sig during access category assignment.

In an example embodiment, the upper layers 302 in the UE may indicate to the UE NAS layer 304 when the 5GC-MO-LR procedure starts and stops. Based on these start and stop indications, while the 5GC-MO-LR procedure is ongoing, the UE NAS layer 304 may be able to skip access control check when a service request procedure or a registration procedure is initiated in 5GMM-IDLE mode for the purpose of NAS signaling connection recovery, or following a fallback indication from the lower layers. In the case of an indication of an ongoing 5GC-MO-LR procedure, the access attempt may be mapped to MO_sig.

In an example embodiment, an additional step may be added to the access control procedure for LR. During this additional step, it may be determined whether an LPP message is part of an ongoing MO-LR procedure. Based on the determination, an access category may be assigned. In contrast to the case of a MT-LR LPP message, an MO-LR LPP message may be assigned a category other than "0" (MT_acc).

In an example embodiment, the non-access stratum (NAS) layer 304 may need to be informed when the 5G core network mobile originated located request (5GC-MO-LR) procedure starts and stops.

Parts of an access control procedure for MO-LR may be similar to the access control procedure for MO-SMSoNAS (mobile originated short message service over non-access stratum). In an example embodiment, a difference between these two procedures may be that a 5G mobility management (5GMM) connection management procedure, initiated for the purpose of transporting an LPP message, may be examined to determine whether the LPP message is sent within an ongoing 5GC-MO-LR procedure. Where the LPP message is sent within an ongoing 5GC-MO-LR procedure, the access category assigned may be "3" (MO_sig), or may be assigned a new access category assigned for MO-LR. Where the LPP message is not sent within an ongoing 5GC-MO-LR procedure, the access category assigned may be "0" (MT_acc), which is never barred. In contrast, for SMSoNAS, a 5GMM connection management procedure initiated for the purpose of transporting an SMS message within a non-MO-SMSoNAS procedure (i.e. MT-SMSoNAS procedure) may be categorized to access category "3", not "0". Thus, for example, if a UE goes idle during an MT-SMSoNAS procedure, access control may be applied (i.e. the access attempt for sending an SMS message within an ongoing MT-SMSoNAS procedure may be barred). For location services, since it can take a long time to fetch a UE's location (i.e., potentially more than 10 seconds), a 5GMM connection management procedure initiated for the purpose of transporting an LPP message may be categorized as MT_acc.

In an example embodiment, the access control procedure for LR may comprise the following steps. With reference to the example protocol stack of the UE described by FIG. 3, a request from upper layers 302 to send a mobile originated location request may be received at the NAS layer 304. The request may be considered a start indication for the 5GC-MO-LR procedure, or the request may be sent to the NAS layer 304 together with the start indication. The NAS layer may identify an access attempt that needs to be initiated due to the request from upper layers. The access attempt may be a 5GMM connection management procedure or UE-initiated NAS transport procedure. The NAS layer 304 may determine an access category and an establishment cause for the access attempt. The NAS layer 304 may provide the access category and the establishment cause to the lower layers 306 and may request that lower layers 306 perform an access control check based on at least the access category.

If the service request procedure or the registration procedure is initiated in 5GMM-IDLE mode for the purpose of NAS signaling connection recovery or following a fallback indication from the lower layers 306 while the 5GC-MO-LR procedure is ongoing (i.e. after receiving the start indication and before receiving the stop indication), the NAS layer 304 may determine an access category and an establishment cause for the service request procedure or the registration procedure and may provide the establishment cause to the lower layers 306. The NAS layer 304 may receive, from the upper layer 302, a stop indication for the 5GC-MO-LR procedure.

In an example embodiment, neither a new access category nor a new RRC establishment cause is needed, and the relevant access attempts may be mapped to MO_sig. In another example embodiment, a new access category (e.g. mobile originated location request) may be defined for an access attempt that needs to be initiated due to a request from upper layers 302. The new access category may be mapped to a new RRC establishment cause (e.g. mobile originated location request) in case the access identity is "0".

In an example embodiment, when the UE needs to access the 5GS, the UE may first perform an access control check to determine if access is allowed for the access attempts. An access control check may be performed when the 5GMM (found in the NAS layer 304 of FIG. 3) receives a request from upper layers 302 to send: a mobile originated location request or an LPP message within the 5GC-MO-LR procedure, unless the request triggered a service request procedure to transition the UE from 5GMM-IDLE mode to 5GMM-CONNECTED mode. If the received request triggered a service request procedure to transition the UE from 5GMM-IDLE mode to 5GMM-CONNECTED mode, an access control check need not be performed by the UE.

In an example embodiment, an access category of "0" (MT_acc) may be appropriate where there is not an ongoing 5GC-MO-LR procedure.

In an example embodiment, an access category of "3" (MO_sig) may be appropriate where the UE NAS 304 initiated 5GMM specific procedures, or in the case of a mobile originated location request. Examples of these scenarios include: a) the UE-initiated NAS transport procedure for transporting a mobile originated location request; b) the 5GMM connection management procedure triggered by a) above; and c) NAS signaling connection recovery during an ongoing 5GC-MO-LR procedure.

In an example embodiment, if the event which triggered the access attempt was a request from upper layers 302 to send a mobile originated location request, the NAS layer 304 (including 5GMM) may initiate the NAS transport procedure to send the mobile originated location request in an UL NAS TRANSPORT message. However, in an alternative example embodiment, if the event which triggered the access attempt was a request from upper layers 302 to send a mobile originated location request, the NAS layer 304 (including 5GMM) might not initiate the NAS transport procedure to send the request in an UL NAS TRANSPORT message, possibly because of barring of the associated access category. However, in this latter case, upon receiving an indication from the lower layers 306 that the barring is alleviated for the access category with which the access attempt was associated, the NAS layer 304 (including 5GMM) may initiate the NAS transport procedure to send the request in an UL NAS TRANSPORT message, if still needed.

In an example embodiment, while a 5GC-MO-LR procedure is ongoing, no SMS (short message service) over NAS is ongoing, no SMSoIP (short message service over internet protocol) is ongoing, no MMTEL (multimedia telephony) video call is ongoing, and no MMTEL voice call is ongoing.

Any service request procedure or registration procedure initiated in 5GMM-IDLE mode for the purpose of NAS signaling connection recovery, or following a fallback indication from the lower layers 306, may be mapped to access category "3" (=MO_sig) or to a new access category for mobile originated location request.

Figure 4:
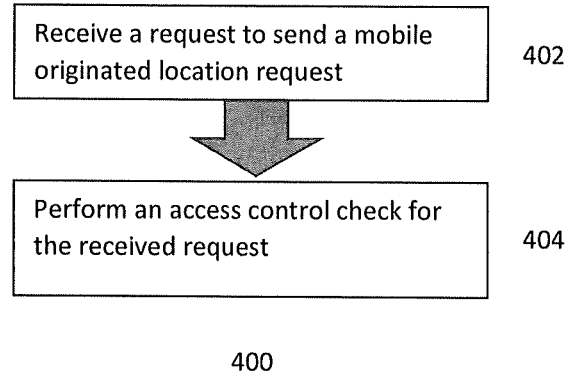
FIG. 4 is a flowchart illustrating steps as described herein.

FIG. 4 illustrates the potential steps of an example embodiment. In accordance with one aspect, an example method 400 may be provided comprising: receiving a request to send a mobile originated location request, 402; and performing an access control check for the received request, 404.

Figure 5:
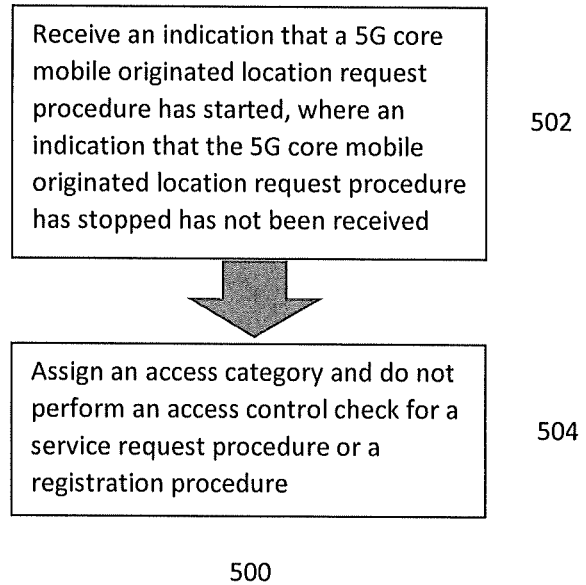
FIG. 5 is a flowchart illustrating steps as described herein.

FIG. 5 illustrates the potential steps of an example embodiment. In accordance with one aspect, an example method 500 may be provided comprising: receiving an indication that a 5G core mobile originated location request procedure has started, where an indication that the 5G core mobile originated location request procedure as stopped has not been received, 502; and assigning an access category and not performing an access control check for a service request procedure or a service registration procedure, 504. The service request procedure or the registration procedure may be one of: a procedure initiated in an idle mode for the purpose of non-access stratum signaling connection recovery, or a procedure following a fallback indication from a lower layer of a protocol stack of the user equipment. The step of assigning an access category and not performing an access control check for a service request procedure or a service registration procedure, 504, may be performed only where: no SMS over non-access stratum is ongoing, no SMSoIP is ongoing, no MMTEL video call is ongoing, and no MMTEL voice call is ongoing.

Figure 6:
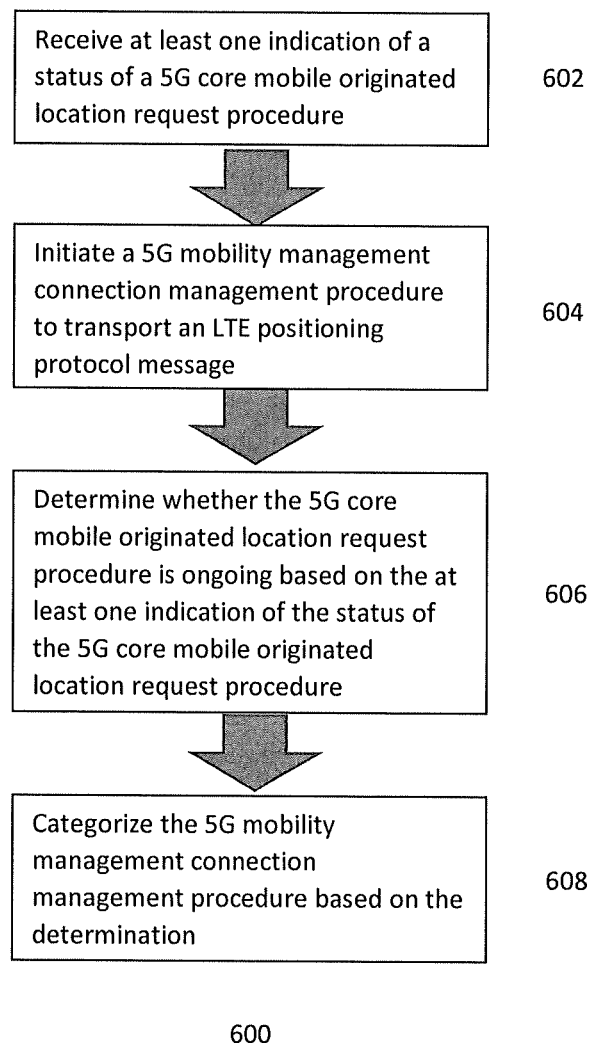
FIG. 6 is a flowchart illustrating steps as described herein.

FIG. 6 illustrates the potential steps of an example embodiment. In accordance with one aspect, an example method 600 may be provided comprising: receiving at least one indication of a status of a 5G core mobile originated location request procedure, 602; initiating a 5G mobility management connection management procedure to transport an LTE positioning protocol message, 604; determining whether the 5G core mobile originated location request procedure is ongoing based on that at least one indication of the status of the 5G core mobile originated location request procedure, 606; and categorizing the 5G mobility management connection management procedure based on the determining, 608. The at least one indication of a status of the 5G core mobile originated location request procedure, 602, may comprise one of: an indication that the 5G core mobile originated location request procedure has started, or an indication that the 5G core mobile originated location request procedure has stopped. The categorizing the 5G mobility management connection management procedure based on the determining, 608, may comprise categorizing the 5G mobility management connection management procedure with one of: an access category for a mobile originated location request based on a determination that the 5G core mobile originated location request procedure is ongoing, or an access category for a mobile terminated access request based on a determination that the 5G core mobile originated location request procedure is not ongoing.

In accordance with one aspect, an example method may be provided comprising: receiving, at a user equipment, a request to send a mobile originated location request; and performing, at the user equipment, an access control check for the received request.

The example method may further comprise identifying an access attempt to be initiated based, at least partially, on the request to send the mobile originated location request; and determining an access category for the identified access attempt, wherein the performing of the access control check may comprise performing the access control check based, at least partially, on the determined access category.

The request to send a mobile originated location request may be sent from an upper layer in the user equipment.

The example method may further comprise determining that an access category for an access attempt is "mobile originated signaling", wherein the access attempt is initiated due to the request to send the mobile originated location request.

In accordance with one example embodiment, an apparatus may be provided comprising: at least one processor; and at least one non-transitory memory including computer program code, the at least one non-transitory memory and the computer program code configured to, with the at least one processor, cause the apparatus to: receive a request to send a mobile originated location request; and perform an access control check for the received request.

The apparatus may be further caused to: identify an access attempt to be initiated based, at least partially, on the request to send the mobile originated location request; and determine an access category for the identified access attempt, wherein performing the access control check may comprise performing the access control check based, at least partially, on the determined access category.

The request to send a mobile originated location request may be sent from an upper layer in the apparatus.

The apparatus may be further caused to: determine that an access category for an access attempt is "mobile originated signaling", wherein the access attempt may be initiated due to the request to send the mobile originated location request.

In accordance with one example embodiment, an apparatus may be provided comprising: means for receiving a request to send a mobile originated location request; and means for performing an access control check for the received request.

The apparatus may further comprise means for identifying an access attempt to be initiated based, at least partially, on the request to send the mobile originated location request; and means for determining an access category for the identified access attempt, wherein the means for performing the access control check may comprise means for performing the access control check based, at least partially, on the determined access category.

The request to send a mobile originated location request may be sent from an upper layer in the apparatus.

The apparatus may further comprise means for determining that an access category for an access attempt is "mobile originated signaling", wherein the access attempt is initiated due to the request to send the mobile originated location request.

In accordance with another example embodiment, a non-transitory program storage device readable by a machine may be provided, tangibly embodying a program of instructions executable by the machine for performing operations, the operations comprising: receiving, at a user equipment, a request to send a mobile originated location request; and performing, at the user equipment, an access control check for the received request.

The operations may further comprise: identifying an access attempt to be initiated based, at least partially, on the request to send the mobile originated location request; and determining an access category for the identified access attempt, wherein the performing of the access control check may comprise performing the access control check based, at least partially, on the determined access category.

The request to send a mobile originated location request may be sent from an upper layer in the user equipment.

The operations may further comprise determining that an access category for an access attempt is "mobile originated signaling", wherein the access attempt may be initiated due to the request to send the mobile originated location request.

In accordance with one aspect, an example method may be provided comprising: receiving, at a user equipment, a start indication when a mobile originated location request procedure has started and a stop indication when the mobile originated location request procedure has stopped.

The start indication and the stop indication may be from an upper layer in the user equipment.

The example method may further comprise: determining that the mobile originated location request procedure is ongoing where the start indication has been received and the stop indication has not been received.

The example method may further comprise: assigning an access category and not performing an access control check for a service request procedure or a registration procedure, where the service request procedure or the registration procedure may be one of: a procedure initiated in an idle mode for the purpose of non-access stratum signaling connection recovery, or a procedure following a fallback indication from a lower layer of a protocol stack of the user equipment, and where: the mobile originated location request procedure may be ongoing, no SMS over non-access stratum may be ongoing, no SMSoIP may be ongoing, no MMTEL video call may be ongoing, and no MMTEL voice call may be ongoing.

The example method may further comprise determining an establishment cause for the service request procedure or the registration procedure.

The assigning of the access category for the service request procedure or the registration procedure may comprise assigning an access category for a mobile originated location request.

In accordance with one example embodiment, an apparatus may be provided comprising: at least one processor; and at least one non-transitory memory including computer program code, the at least one non-transitory memory and the computer program code configured to, with the at least one processor, cause the apparatus to: receive a start indication when a mobile originated location request procedure has started and a stop indication when the mobile originated location request procedure has stopped.

The start indication and the stop indication may be from an upper layer in the apparatus.

The apparatus may be further configured to: determine that the mobile originated location request procedure is ongoing where the start indication has been received and the stop indication has not been received.

The apparatus may be further configured to: assign an access category and not perform an access control check for a service request procedure or a registration procedure, where the service request procedure or the registration procedure may be one of: a procedure initiated in an idle mode for the purpose of non-access stratum signaling connection recovery, or a procedure following a fallback indication from a lower layer of a protocol stack of the user equipment, and where: the mobile originated location request procedure is ongoing, no short message service over non-access stratum is ongoing, no short message service over internet protocol is ongoing, no multimedia telephony video call is ongoing, and no multimedia telephony voice call is ongoing.

The apparatus may be further configured to determine an establishment cause for the service request procedure or the registration procedure.

Assigning the access category for the service request procedure or the registration procedure may comprise assigning an access category for a mobile originated location request.

In accordance with one example embodiment, an apparatus may be provided comprising: means for receiving a start indication when a mobile originated location request procedure has started and a stop indication when the mobile originated location request procedure has stopped.

The start indication and the stop indication may be from an upper layer in the apparatus.

The apparatus may further comprise: means for determining that the mobile originated location request procedure is ongoing where the start indication has been received and the stop indication has not been received.

The apparatus may further comprise: means for assigning an access category and not performing an access control check for a service request procedure or a registration procedure, where the service request procedure or the registration procedure may be one of: a procedure initiated in an idle mode for the purpose of non-access stratum signaling connection recovery, or a procedure following a fallback indication from a lower layer of a protocol stack of the apparatus, and where: the mobile originated location request procedure is ongoing, no short message service over non-access stratum is ongoing, no short message service over Internet protocol is ongoing, no multimedia telephony video call is ongoing, and no multimedia telephony voice call is ongoing.

The apparatus may further comprise means for determining an establishment cause for the service request procedure or the registration procedure. The means for assigning the access category for the service request procedure or the registration procedure may comprise means for assigning an access category for a mobile originated location request.

In accordance with another example embodiment, a non-transitory program storage device readable by a machine may be provided, tangibly embodying a program of instructions executable by the machine for performing operations, the operations comprising: receiving a start indication when a mobile originated location request procedure has started and a stop indication when the mobile originated location request procedure has stopped.

The start indication and the stop indication may be from an upper layer in a user equipment.

The operations may further comprise: determining that the mobile originated location request procedure is ongoing where the start indication has been received and the stop indication has not been received.

The operations may further comprise: assigning an access category and not performing an access control check for a service request procedure or a registration procedure, where the service request procedure or the registration procedure may be one of: a procedure initiated in an idle mode for the purpose of non-access stratum signaling connection recovery, or a procedure following a fallback indication from a lower layer of a protocol stack of the user equipment, and where: the mobile originated location request procedure is ongoing, no short message service over non-access stratum is ongoing, no short message service over Internet protocol is ongoing, no multimedia telephony video call is ongoing, and no multimedia telephony voice call is ongoing.

The operations may further comprise determining an establishment cause for the service request procedure or the registration procedure.

The assigning of the access category for the service request procedure or the registration procedure may comprise assigning an access category for a mobile originated location request.

In accordance with one aspect, an example method may be provided comprising: receiving, at a user equipment, at least one indication of a status of a 5G core mobile originated location request procedure, where each of the at least one indication comprises one of: an indication that the 5G core mobile originated location request procedure has started, or an indication that the 5G core mobile originated location request procedure has stopped; initiating, at the user equipment, a 5G mobility management connection management procedure to transport an LTE positioning protocol message; determining, at the user equipment, whether the 5G core mobile originated location request procedure is ongoing based on the at least one indication of the status of the 5G core mobile originated location request procedure; and categorizing, at the user equipment, the 5G mobility management connection management procedure, based on the determining, with: an access category for a mobile originated location request based on a determination that the 5G core mobile originated location request procedure is ongoing, or an access category for a mobile terminated access request based on a determination that the 5G core mobile originated location request procedure is not ongoing.

The example method may further comprise: receiving a request to send one of: a long term evolution positioning protocol message within the 5G core mobile originated location request procedure, or a mobile originated location request, and one of: performing an access control check for the 5G mobility management connection management procedure where the received request does not trigger the user equipment to transition from an idle mode to a connected mode, or not performing an access control check for the 5G mobility management connection management procedure where the received request triggers the user equipment to transition from an idle mode to a connected mode.

The access category for the mobile originated location request may comprise MO_sig, and the access category for the mobile terminated access request may comprise MT_acc.

In accordance with one example embodiment, an apparatus may be provided comprising: at least one processor; and at least one non-transitory memory including computer program code, the at least one non-transitory memory and the computer program code configured to, with the at least one processor, cause the apparatus to: receive at least one indication of a status of a 5G core mobile originated location request procedure, where each of the at least one indication comprises one of: an indication that the 5G core mobile originated location request procedure has started, or an indication that the 5G core mobile originated location request procedure has stopped; initiate a 5G mobility management connection management procedure to transport an LTE positioning protocol message; determine whether the 5G core mobile originated location request procedure is ongoing based on the at least one indication of the status of the 5G core mobile originated location request procedure; and categorize the 5G mobility management connection management procedure, based on the determining, with: an access category for a mobile originated location request based on a determination that the 5G core mobile originated location request procedure is ongoing, or an access category for a mobile terminated access request based on a determination that the 5G core mobile originated location request procedure is not ongoing.

The apparatus may be further caused to: receive a request to send one of: a long term evolution positioning protocol message within the 5G core mobile originated location request procedure, or a mobile originated location request, and one of: perform an access control check for the 5G mobility management connection management procedure where the received request does not trigger the apparatus to transition from an idle mode to a connected mode, or not perform an access control check for the 5G mobility management connection management procedure where the received request triggers the apparatus to transition from an idle mode to a connected mode.

The access category for the mobile originated location request may comprise MO_sig, and the access category for the mobile terminated access request may comprise MT_acc.

In accordance with one example embodiment, an apparatus may be provided comprising: means for receiving at least one indication of a status of a 5G core mobile originated location request procedure, where each of the at least one indication comprises one of: an indication that the 5G core mobile originated location request procedure has started, or an indication that the 5G core mobile originated location request procedure has stopped; means for initiating a 5G mobility management connection management procedure to transport an LTE positioning protocol message; means for determining whether the 5G core mobile originated location request procedure is ongoing based on the at least one indication of the status of the 5G core mobile originated location request procedure; and means for categorizing the 5G mobility management connection management procedure, based on the determining, with: an access category for a mobile originated location request based on a determination that the 5G core mobile originated location request procedure is ongoing, or an access category for a mobile terminated access request based on a determination that the 5G core mobile originated location request procedure is not ongoing.

The apparatus may further comprise means for receiving a request to send one of: a long term evolution positioning protocol message within the 5G core mobile originated location request procedure, or a mobile originated location request, and one of: means for performing an access control check for the 5G mobility management connection management procedure where the received request does not trigger the apparatus to transition from an idle mode to a connected mode, or means for not performing an access control check for the 5G mobility management connection management procedure where the received request triggers the apparatus to transition from an idle mode to a connected mode.

The access category for the mobile originated location request may comprise MO_sig, and the access category for the mobile terminated access request may comprise MT_acc.

In accordance with another example embodiment, a non-transitory program storage device readable by a machine may be provided, tangibly embodying a program of instructions executable by the machine for performing operations, the operations comprising: receiving at least one indication of a status of a 5G core mobile originated location request procedure, where each of the at least one indication comprises one of: an indication that the 5G core mobile originated location request procedure has started, or an indication that the 5G core mobile originated location request procedure has stopped; initiating a 5G mobility management connection management procedure to transport an LTE positioning protocol message; determining whether the 5G core mobile originated location request procedure is ongoing based on the at least one indication of the status of the 5G core mobile originated location request procedure; and categorizing the 5G mobility management connection management procedure, based on the determining, with: an access category for a mobile originated location request based on a determination that the 5G core mobile originated location request procedure is ongoing, or an access category for a mobile terminated access request based on a determination that the 5G core mobile originated location request procedure is not ongoing.

The operations may further comprise: receiving a request to send one of: a long term evolution positioning protocol message within the 5G core mobile originated location request procedure, or a mobile originated location request, and one of: performing an access control check for the 5G mobility management connection management procedure where the received request does not trigger the user equipment to transition from an idle mode to a connected mode, or not performing an access control check for the 5G mobility management connection management procedure where the received request triggers the user equipment to transition from an idle mode to a connected mode.

The access category for the mobile originated location request may comprise MO_sig, and the access category for the mobile terminated access request may comprise MT_acc.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modification and variances which fall within the scope of the appended claims.

What is claimed is:

1. A method of a user equipment, the method comprising:
receiving, by the user equipment, a request from an upper layer of a protocol stack in the user equipment to send a mobile originated location request;
identifying, by the user equipment, an access attempt to be initiated by a non-access stratum (NAS) layer in the protocol stack of the user equipment based, at least partially, on the request to send the mobile originated location request;
determining, by the user equipment, that an access category for the identified access attempt is mobile originated signaling; and
performing, by the user equipment, an access control check for the received request based, at least partially, on the determined access category.

2. A user equipment comprising:
at least one processor; and
at least one non-transitory memory including computer program code, the at least one non-transitory memory and the computer program code configured to, with the at least one processor, cause the user equipment to:
receive a request from an upper layer of a protocol stack in the user equipment to send a mobile originated location request;
identify an access attempt to be initiated by a non-access stratum (NAS) layer of the protocol stack in the user equipment based, at least partially, on the request to send the mobile originated location request;
determine that an access category for the identified access attempt is mobile originated signaling; and
perform an access control check for the received request based, at least partially, on the determined access category.

3. A method of a user equipment, the method comprising:
receiving, by the user equipment, from an upper layer of a protocol stack in the user equipment a start indication when a mobile originated location request procedure has started and a stop indication when the mobile originated location request procedure has stopped; and
assigning, by the user equipment, an access category and not performing an access control check for a service request procedure or a registration procedure, where the service request procedure or the registration procedure comprises:
a procedure initiated in an idle mode for the purpose of non-access stratum signaling connection recovery, and
where:
the mobile originated location request procedure is ongoing,
no short message service over non-access stratum is ongoing,
no short message service over internet protocol is ongoing,
no multimedia telephony video call is ongoing, and
no multimedia telephony voice call is ongoing.

4. The method of claim 3, further comprising: determining, by the user equipment, that the mobile originated location request procedure is ongoing where the start indication has been received and the stop indication has not been received.

5. The method of claim 3, further comprising determining, by the user equipment, an establishment cause for the service request procedure or the registration procedure.

6. The method of claim 3, wherein the assigning of the access category for the service request procedure or the registration procedure comprises assigning, by the user equipment, an access category for a mobile originated location request.

7. A user equipment comprising:
at least one processor; and
at least one non-transitory memory including computer program code, the at least one non-transitory memory and the computer program code configured to, with the at least one processor, cause the user equipment to:
receive from an upper layer of a protocol stack inef the user equipment a start indication when a mobile originated location request procedure has started and a stop indication when the mobile originated location request procedure has stopped; and
assign an access category and not performing an access control check for a service request procedure or a registration procedure, where the service request procedure or the registration procedure comprises:
a procedure initiated in an idle mode for the purpose of non-access stratum signaling connection recovery, and
where:
the mobile originated location request procedure is ongoing,
no short message service over non-access stratum is ongoing,
no short message service over internet protocol is ongoing, no multimedia telephony video call is ongoing, and
no multimedia telephony voice call is ongoing.

8. The user equipment of claim 7, the at least one non-transitory memory and the computer program code configured to, with the at least one processor, further cause the user equipment to:
    determine that the mobile originated location request procedure is ongoing where the start indication has been received and the stop indication has not been received.

9. The user equipment of claim 7, the at least one non-transitory memory and the computer program code configured to, with the at least one processor, further cause the user equipment to determine an establishment cause for the service request procedure or the registration procedure.

10. The user equipment of claim 7, wherein assigning the access category for the service request procedure or the registration procedure comprises assigning an access category for a mobile originated location request.

11. A non-transitory program storage device readable by a machine, tangibly embodying a program of instructions executable by the machine for performing operations, the operations comprising the steps of a method of claim 1.

* * * * *